Patented Apr. 13, 1943

2,316,250

UNITED STATES PATENT OFFICE 2,316,250

TETRAHYDRO BENZOTHIAZOLE

Paul C. Jones, Silver Lake, Ohio, assignor to The B. F. Goodrich Company, New York, N. Y., a corporation of New York No Drawing. Application December 31, 1940,
Serial No. 372,573

2 Claims. (Cl. 260—302)

This invention relates to a new composition of matter and pertains specifically to 2-mercapto tetrahydrobenzo-thiazole and its alkyl and alkoxy derivatives.

The parent compound, mercapto benzothiazole, has long been known and has been produced on a large scale for many years. All attempts, however, to obtain by hydrogenation a partially reduced 2-mercapto benzothiazole have been failures. It has been shown to be impossible to reduce the benzene ring without also reducing the thiazole nucleus when any of the known methods of reduction are used. Most of the reducing processes, in fact, are not clear cut reactions in this case and yield no definite product, but only an impure tarry mass which is worthless from a commercial point of view.

I have now discovered that a partially reduced 2-mercapto benzothiazole, as for example 2-mercapto tetrahydrobenzo-thiazole, can be prepared by reacting alpha chloro-cyclohexanone with salts of unsubstituted dithiocarbamic acid. This reaction has never before been used to produce my new compound or any of its analogues, but has largely been limited to the reaction of straight chain halogenated ketones such as chloracetone, 3-chlorobutanone-2, 1-chlorobutanone-2, 3-chloropentanone-2, and the like. By using the saturated cyclic ketone, I am able to produce a compound which has hitherto been unknown in spite of innumerable attempts to synthesize it. Any of the alkali metal or the ammonium salts of dithiocarbamic acid may be used to react with the alpha chlorocyclohexanone and its derivatives.

The reaction may be carried out under the same conditions as those used in reacting the straight chain or branched chain ketones. As a specific example of my invention I have prepared 2-mercapto tetrahydrobenzo-thiazole by the following process:

17.2 parts by weight of alpha chlorocyclohexanone is suspended in a solution of 16.2 parts of ammonium dithiocarbamate in 25 parts of water. The mixture is heated to 90° C., at which temperature the reaction is completed within a few minutes, yielding a greenish oil, insoluble in water, which partly solidifies to a pasty mass upon cooling. After standing for a few hours the solid is filtered from the reaction mixture, washed with water, and dissolved in a solution of 5 parts of sodium hydroxide in 25 parts of water. Upon filtration and acidification a buff-colored precipitate is obtained which melts at 162° C. The reaction may also be carried out satisfactorily in an organic medium such as gasoline or other volatile aliphatic hydrocarbon solvent.

It is believed that the reaction takes place according to the following equation:

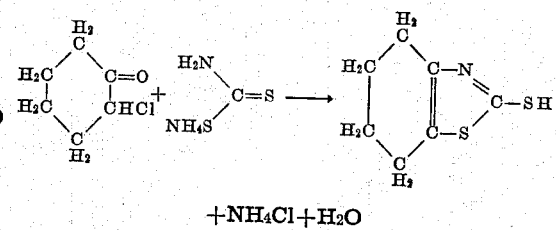

$+NH_4Cl+H_2O$

The reaction is not limited to six-membered cyclic ketones, but may be used with any alpha-halogenated cyclic alkyl ketone. My new compound, 2-mercapto tetrahydrobenzo-thiazole, is particularly useful as an accelerator for the vulcanization of rubber, as are its various alkyl and alkoxy derivatives which can be made from the corresponding alkyl and alkoxy derivatives of the chlorocyclohexanone

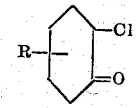

in which R is an alkyl or alkoxy group and which may be prepared as described by Kötz & Steinhorst, Annalen der Chemie 379, 21 (1911); by Godchot & Bedos, Comptes Rendus 178, 1374–5 (1924); by Braun & Häensel, Berichte 59, 2008 (1926); and by others. Among such thiazoles are 2-mercapto 5-methyl tetrahydrobenzo-thiazole, 2-mercapto 5,6-dimethyl tetrahydrobenzo-thiazole, 2 mercapto 4-methyl tetrahydrobenzo-thiazole, 2-mercapto 4-ethyl tetrahydrobenzo-thiazole, 2-mercapto 4,5-diethyl tetrahydrobenzo-thiazole, 2-mercapto 5,6-diethyl tetrahydrobenzo-thiazole, 2-mercapto 7-ethyl tetrahydrobenzo-thiazole, 2-mercapto 5-methoxy tetrahydrobenzo-thiazole, 2-mercapto 5-methyl 6-methoxy tetra-hydrobenzo-thiazole, and similar compounds.

As is apparent from the above description, I have solved the problem of the partial reduction of 2-mercapto benzothiazole and its derivatives not by devising a new method of reduction, but by evolving an entirely new synthesis which has been developed using a saturated hydrocarbon ring as a starting point rather than an aromatic ring. It is in effect a partial oxidation of the completely reduced form rather than a partial reduction of the oxidized form.

Although I have herein disclosed specific embodiments of my invention, I do not intend to limit myself solely thereto, for many modifications and variations fall within the spirit and scope of the appended claims.

I claim:

1. A 2-mercapto tetrahydrobenzo-thiazole containing no substituent groups in the tetrahydrobenzene nucleus other than hydrogen, alkyl, and alkoxy groups.

2. 2-mercapto tetrahydrobenzo-thiazole.

PAUL C. JONES.